United States Patent [19]

Manfredi

[11] Patent Number: 4,586,375
[45] Date of Patent: May 6, 1986

[54] REUSABLE CENTRIFUGE FIXTURE AND METHODS OF MAKING AND USING SAME

[75] Inventor: Armando G. Manfredi, Readington Township, Hunterdon County, N.J.

[73] Assignee: RCA Corporation, Princeton, N.J.

[21] Appl. No.: 645,217

[22] Filed: Aug. 29, 1984

[51] Int. Cl.[4] .................. G01N 3/08; G01N 33/00; G01N 19/00
[52] U.S. Cl. .................... 73/432 R; 494/10; 73/824
[58] Field of Search .............. 73/432 K, 432 R, 818, 73/824; 494/10, 85, 43

[56] References Cited

U.S. PATENT DOCUMENTS

| | | |
|---|---|---|
| 1,439,378 | 12/1922 | Preston . |
| 2,198,256 | 4/1940 | Levy ........................ 494/10 |
| 3,434,657 | 3/1969 | Luckham et al. ........... 494/10 |
| 3,648,927 | 3/1972 | Abbe et al. ................ 494/43 |
| 3,720,368 | 3/1973 | Allen ..................... 494/10 X |
| 3,745,832 | 7/1973 | Johnson ................. 73/432 K |
| 4,082,217 | 4/1978 | Westberg ................ 494/85 X |

FOREIGN PATENT DOCUMENTS

| | | | |
|---|---|---|---|
| 524094 | 11/1976 | U.S.S.R. ............ 73/432 K |
| 658426 | 4/1979 | U.S.S.R. ............ 73/432 K |

Primary Examiner—Stewart J. Levy
Assistant Examiner—Tom Noland
Attorney, Agent, or Firm—Birgit E. Morris; Donald S. Cohen; James M. Trygg

[57] ABSTRACT

A reusable centrifuge fixture is disclosed for holding small parts, such as integrated circuit chips, during high speed rotation. The fixture is made of a moldable material having a depression formed therein conforming to the contours of the part. The fixture is made by pouring the moldable material into an open cavity of a form and the part to be centrifuged, or a replica thereof, is impressed into the surface of the moldable material prior to curing. A permanent magnet is used in conjunction with the fixture to hold the part within the centrifuge machine during set-up of the machine.

6 Claims, 7 Drawing Figures

REUSABLE CENTRIFUGE FIXTURE AND METHODS OF MAKING AND USING SAME

This invention relates to a reusable centrifuge fixture for holding a part while the part is rotated at high speed in a centrifuge machine and methods for making and using the fixture.

BACKGROUND OF THE INVENTION

Centrifuge machines of the type used for rotating small parts, such as integrated circuit chips attached to a lead frame, typically utilize a rotatable drum. The drum has an interior cavity, usually of cylindrical shape, which is rotatable about its major axis. As is depicted in FIG. 1, a part 10 to be rotated is shown in a fixture 12 which is specifically adapted to receive the part.

The fixture 12 is removably attached to a centrifuge boat 14 thereby permitting various fixtures to be used interchangably with the same boat. The fixture 12, as shown, includes a cavity 16 for an integrated circuit (IC) chip which is mounted to a lead frame and enclosed to form an IC package 10. A magnet 18 is embedded in the fixture 12 so that when the IC package is placed in the fixture, the metal cover of the IC package will be adjacent the magnet. This magnet firmly holds the IC package in place during set up of the centrifuge machine and while other manual operations are being performed by the operator. The fixture 12 is typically fabricated from metal and requires delicate and highly accurate machining operations in its manufacture.

Two problems are encountered in the use of such metal fixtures. The first is that the metal fixture adds significant mass to the rotating component of the centrifuge machine. This results in the need for a larger, more expensive machine than would otherwise be required. The second problem is that the cavity 16, which is adapted to receive the IC package, has hard, non-yielding metalic surfaces which are flat. Part of the IC package on the other hand, is made of a very hard refractory material usually having uneven surfaces. These uneven surfaces are necessarily placed in contact with the metalic surfaces of the fixture resulting in actual contact only at spaced points or areas leaving other areas of the IC package unsupported. When the IC package and fixture are subjected to relatively high G-forces, e.g. over 30,000, during the course of operation of the centrifuge machine, the refractory material will sometimes crack thereby destroying the chip's usefulness.

To alleviate these problems associated with metal fixtures, wax is sometimes used in place of metal. In this case molten wax is poured into a cavity formed in the boat and the IC package impressed into the soft wax. Cracking is reduced by using this technique, however, some cracking will still occur due to air bubbles, being trapped in the wax resulting in uneven support of the IC package. Further, the process of making the wax fixture and subsequent cleaning of the IC package after the centrifuge operation is time consuming and tedious. Unfortunately, the wax fixture is necessarily damaged when removing the IC package and, therefore, is not reusable. The cleaning operation must be thorough to assure that all traces of wax contaminants are removed from the leads prior to assembling the IC package to a PC board.

The present invention overcomes these problems inherent in the metal and wax fixtures through the novel use of a moldable material to produce a reusable centrifuge fixture that is easily and inexpensively made.

DESCRIPTION OF THE PREFERRED EMBODIMENT

Figure 1:
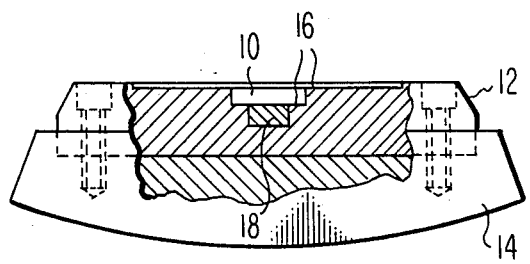
FIG. 1 is an end view in partial cross secion of a prior art centrifuge boat.
Figure 2:
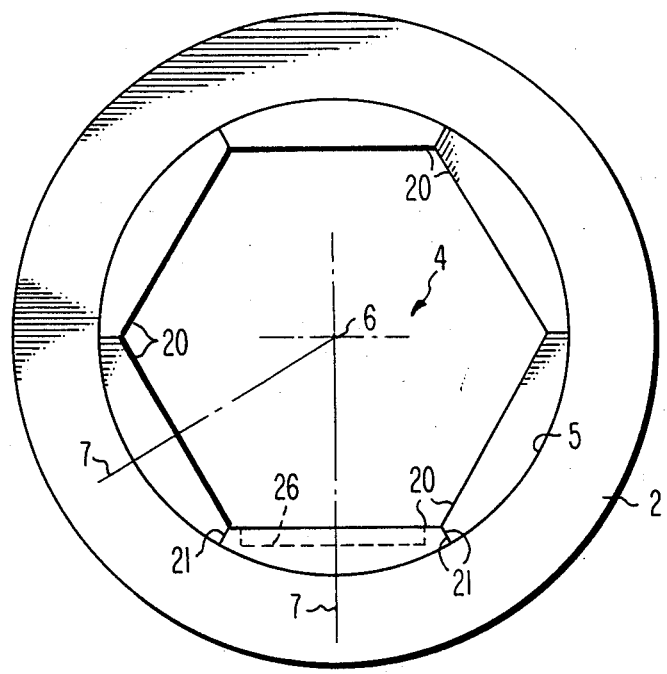
FIG. 2 is a top view of a centrifuge drum showing a plurality of centrifuge boats therein.

FIG. 2 shows a rotatable drum 2 of a centrifuge machine having an interior 4 encompassed by an inner wall 5. The drum is arranged to rotate about the axis 6 when in operation. Six centrifuge boats 20 are disposed within the interior 4 against the inner wall 5. The boats 20 have beveled side edges 21 which interlock thereby retaining the six boats in place. The boats 20 are arranged so that each boat is bisected by a radial 7 that emenates from the axis 6.

Figure 3:
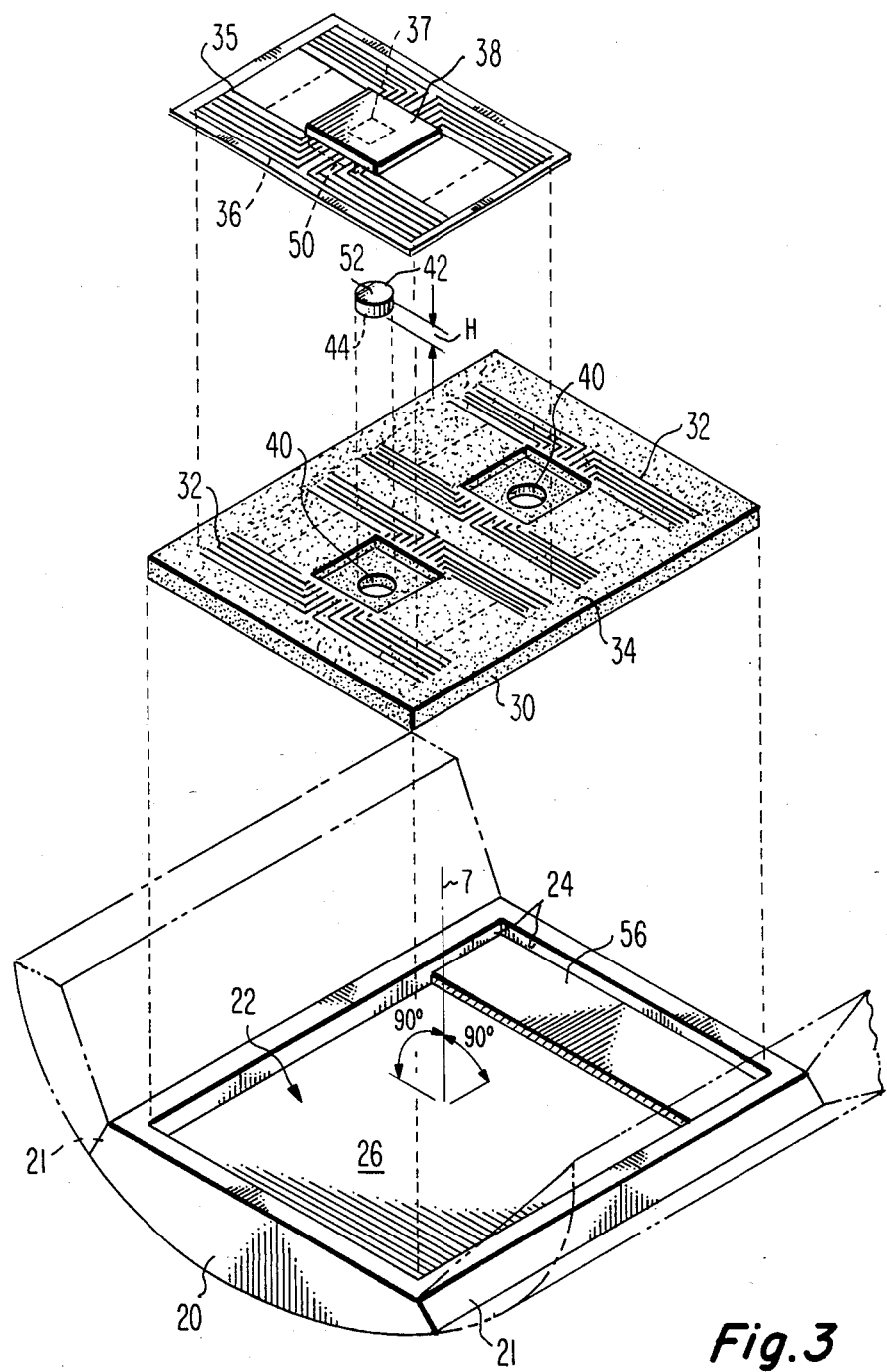
FIG. 3 is an isometric view of a centrifuge boat, reusable fixture, and part to be centrifuged in related proximity.

FIG. 3 shows one of the centrifuge boats 20, of FIG. 2, having a rectangular shaped open cavity 22 with side walls 24 and a bottom 26. The bottom 26 is arranged perpendicular to the radial 7. A reusable centrifuge fixture 30, being of substantially the same shape and size as the cavity 22, is adapted to be removably inserted into the cavity 22 and frictionally held in place. A pair of depressions 32 are disposed in the surface 34 of the fixture 30. The depressions 32 are of substantially the same contour as a side 36 of an IC package 38 that is to be centrifuged. The IC package 38 includes a metal lead frame 35, an IC chip 37, and a cover 50 that is usually metallic. Each depression 32 is arranged so that when the proper side of the IC package 38 is in engagement therewith, the portion of the IC chip that is to be placed in tension is aligned with a radial 7. The direction of tension is always along the radial 7, therefore, the IC package must be properly oriented with respect to the radial so that the tension will occur in the desired direction. There may be one, two, or more depressions 32 depending on the relative sizes of the IC package 38 and the fixture 30. The moldable material must be chosen and cured so that the surface of the depression 32 has some resiliency yet is sufficiently firm to support the IC package of pressures up to 50,000 G forces. The surface of the depression 32 should be capable of deforming a small amount to assure even support over the entire side 36 of the IC package independent of any small variations in the surface.

A hole 40 is disposed in each depression 32 for receiving a permanent magnet 42. With the reusable fixture snuggly in place within the cavity 22, the magnet 42 is arranged in the hole 40 so that a bottom surface 44 of the magnet is in magnetic contact with the bottom 26 of the cavity. The magnet 42 is of cylindrical or other suitable shape having a height H as indicated in FIG. 2.

The height H is chosen so that when the IC package 38 is firmly seated in the depression 32, the metalic cover 50 of the IC package is magnetically attracted to an upper surface 52 of the magnet 42. This serves to hold the IC package 38 in proper position within the reusable fixture 30 during manual set up of the centrifuge machine and related equipment. Instead of the hole 40 and magnet 42, a relatively thin rubberized sheet magnet 46 may be disposed flat against the bottom 26 of the cavity 22 so that it covers substantially the entire bottom 26. The sheet magnet 56 is particularly effective when centrifuging relatively low mass parts having a large surface area attracted by the magnet.

Figure 4:
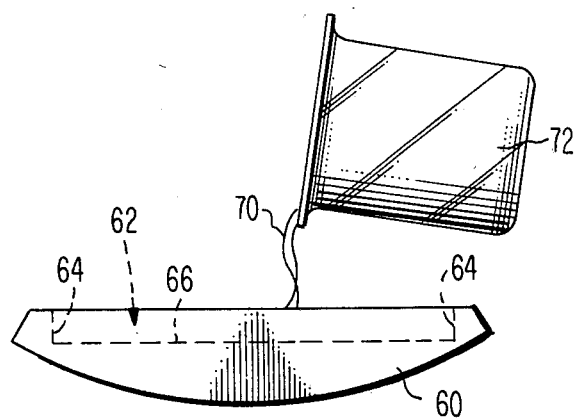
FIG. 4 is an end view of a centrifuge boat showing molding material being poured into an open cavity.
Figure 5:
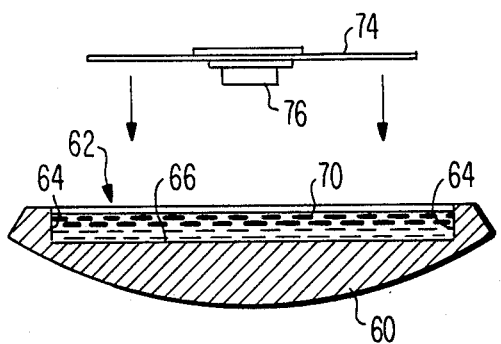
FIG. 5 is an end view in cross section of the boat of FIG. 4.
Figure 6:
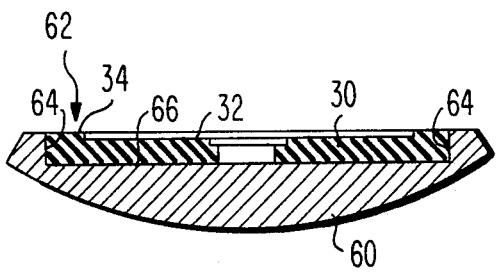
FIG. 6 is an end view in cross secion of the boat of FIG. 4 showing a centrifuge fixture embodying the teachings of the present invention.
Figure 7:
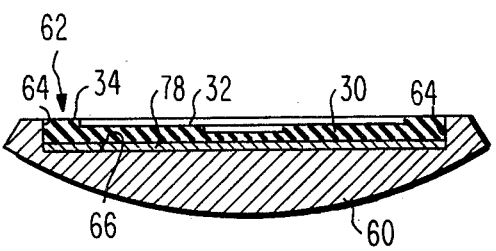
FIG. 7 is a view similar to that of FIG. 6 showing another embodiment of the present invention.

FIGS. 4 through 6 show the major processing steps and apparatus needed to make the reusable fixture 30 in the case where the magnet 42 is used. A form 60 is shown having an upwardly facing open cavity 62, as viewed in FIG. 4. The cavity 62 is of rectangular shape having side walls 64 and a bottom 66 and is identical to the cavity 22 of the boat 20. The outer shape of the form 60 is unimportant, therefore, a boat 20 may be used as the form 60. A moldable material 70, is poured from a container 72 into the cavity 62. Any suitable material such as Silicon Rubber Molding Compound RTV 664, a General Electric Co. product which is commercially available may be used. The only restriction is that it have resiliency characteristics when cured as discussed above. The moldable material 70 only partially fills the cavity 62 so that when the depression 32 is made, the moldable material 70 remains completely within the confines of the cavity, see FIG. 5. As shown in FIG. 5, a replica 74 of the part 38 to be centrifuged, or the actual part itself, has a spacer 76 attached thereto. The spacer 76 is similar in size and shape to the magnet 42 and is appropriately positioned with respect to a magnetic surface of the IC package 38. The replica 74 and attached spacer 76 are substantially centered over the partially filled cavity 62 and lowered onto the surface 34 and pressed into the uncured moldable material 70. Sufficient pressure is applied to the replica 74 in a downward direction, as viewed in FIG. 5, to cause the replica 74 and spacer 76 to partially submerge into and displace a quantity of the uncured moldable material 70. The replica 74 is oriented so that the desired direction of tension is perpendicular to the bottom 66. The pressure is applied continuously until the spacer 76 contacts the surface 66, as shown in FIG. 6, thereby effecting the depression 32.

The replica 74 and attached spacer 76 is permitted to remain in this position until the moldable material 70 cures into a flexible but solid fixture 30. The replica 74 and spacer 76 are removed and the fixture 30 is removed from the cavity 62. Any standard parting agent that is well known in the art may be used to facilitate the removal of the fixture 30. Should such a parting agent be used, the fixture 30 must be suitably cleaned prior to its first use.

Since the cavity 62 is identical to the cavity 22 of the boat 20, and all of the boats are identical, all of the reusable fixtures 30 are completely interchangable with each boat.

In the case where the rubberized sheet magnet 56 is used, the spacer 76 is dispensed with. However, a spacer 78 having a thickness that is substantially similar to that of the sheet magnet 56 is placed in the bottom of the cavity 62 prior to pouring the moldable material 70 into the cavity. The spacer 78 should cover the entire bottom 66 and fit snuggly against the walls 64 to prevent entry of the moldable material 70 into the areas between the edges of the spacer and the walls. The cavity 62 is then partially filled with the moldable material 70 and the replica 74 without the spacer 76 is pressed into the uncured moldable material. When the moldable material 70 is cured the replica 74 is separated from the fixture 30 and the fixture removed from the form 60 as set forth above.

The very significant advantages inherent in the teachings of the present invention over the reusable fixtures of the prior art are: (1) the low cost and low time required to produce the reusable fixture 30; (2) interchangability of the fixtures 30; (3) substantially less weight to be rotated in the centrifuge machine; and (4) far fewer IC packages are damaged due to out of tolerance or irregular parts seating against rigid surfaces.

In operation, the reusable fixture 30 is placed in the cavity 22 of the boat 20 and firmly seated against the bottom 26. The magnet 42 is inserted into the hole 40 of the fixture 30 so that the surface 44 of the magnet is in magnetic engagement with the bottom 26 of the boat 20. An IC package 38, that is to be centrifuged, is arranged so that its side 36 is in snug engagement with the depression 32 and the cover 50 is in magnetic contact with the surface 52 of the magnet 42. The assembly is then placed in the drum 2 of the centrifuge machine in interlocking engagement with the other boats as shown in FIG. 2. The drum 2 is then rotated at a speed that will place the desired portion of the IC package 38 in the desired tension along the radial 7. After rotation is stopped the boat is removed from the drum, the IC package 38 replaced by another and the process repeated until all have been centrifuged.

I claim:

1. In a method of centrifuging a part in a centrifuge machine wherein a portion of said part is to be placed in tension in a predetermined direction relative to a side of said part, said direction being coincident with a radial of said centrifuge machine, the steps of:
   (a) providing a reusable centrifuge fixture for holding said part wherein said fixture is arranged on said radial and includes a region of molded material having a surface with a depression therein corresponding to the contours of said side of said part, the surface of said depression being resilient;
   (b) placing said part into said fixture wherein said side mates with said depression; and
   (c) rotating said fixture and part about the origin of said radial.

2. The method set forth in claim 1 including the step of placing a magnet in an opening within said depression prior to step (c).

3. The method set forth in claim 1 including the step of placing a sheet magnet adjacent another surface of said fixture that is opposite said surface having said depression prior to step (c).

4. In a centrifuge machine for centrifuging a substantially rigid part wherein a portion of said part is to be placed in tension in a predetermined direction relative to a side of said part and wherein said machine includes a boat for holding a centrifuge fixture arranged to rotate about the origin of a radial and having an open cavity therein the opening of which is facing said origin, a reusable centrifuge fixture comprising:
   (a) a region of molded material in said open cavity having an exposed surface;
   (b) a depression in said surface of said molded material substantially conforming to said side of said part, said depression having a resilient surface, and being arranged so that when said side is mated therewith said predetermined direction is coincident with said radial.

5. The apparatus set forth in claim 4 wherein said exposed surface of said region of molded material is substantially normal to said radial.

6. The apparatus set forth in claim 5 including a magnet arranged in magnetic contact with both said boat and said part to be centrifuged.

* * * * *